Oct. 28, 1952     E. G. ANGER ET AL     2,616,041
NONREPEAT CONTROL CIRCUIT
Filed March 7, 1950
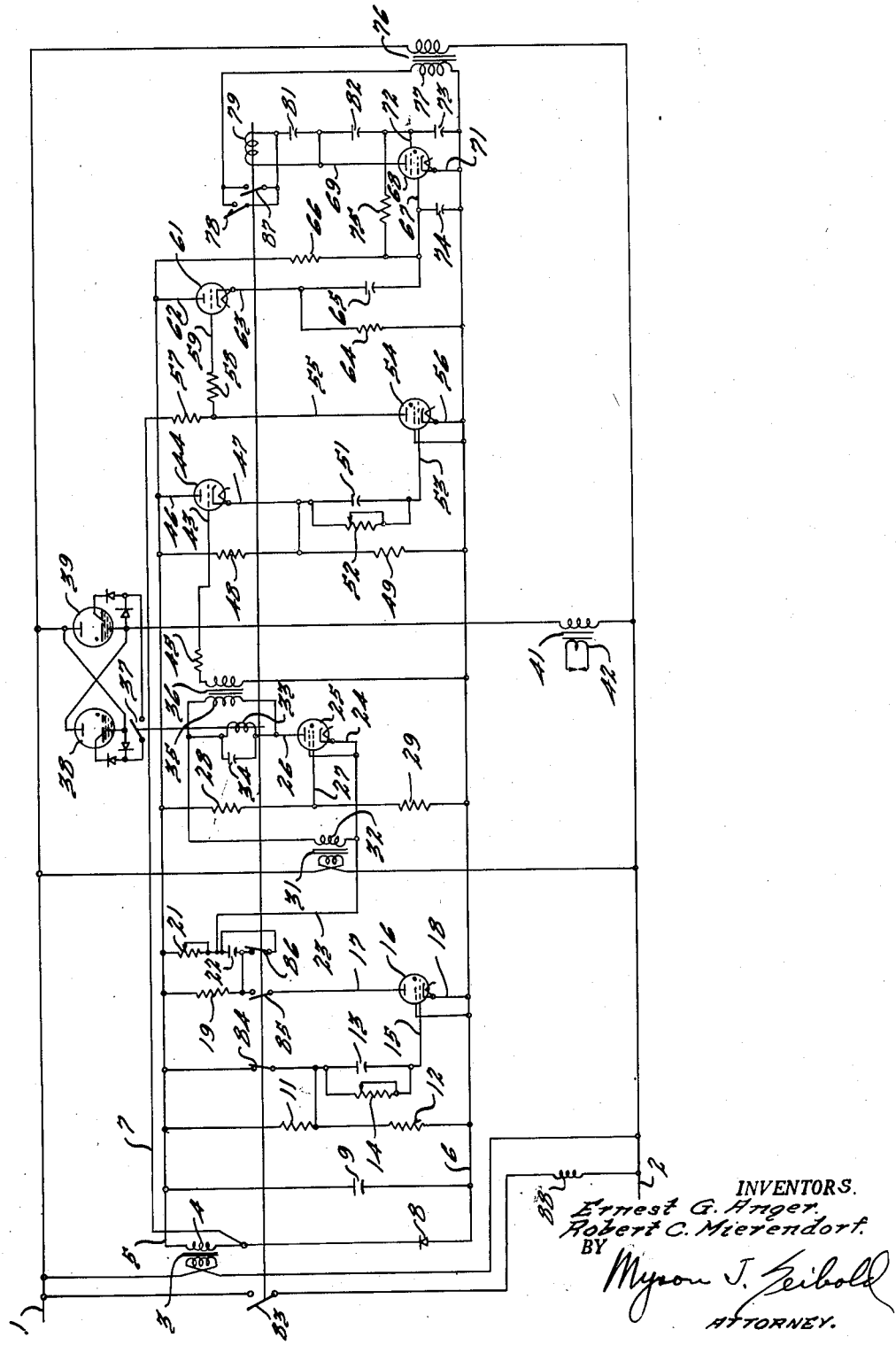
INVENTORS.
*Ernest G. Anger.*
*Robert C. Mierendorf.*
BY
*Myron J. Seibold*
ATTORNEY.

Patented Oct. 28, 1952

2,616,041

UNITED STATES PATENT OFFICE 2,616,041

NONREPEAT CONTROL CIRCUIT

Ernest G. Anger, Wauwatosa, and Robert C. Mierendorf, Milwaukee, Wis., assignors to Square D Company, Detroit, Mich., a corporation of Michigan Application March 7, 1950, Serial No. 148,192

9 Claims. (Cl. 250—27)

1

This invention relates to an electrical circuit arrangement by which an electronic tube which is caused to conduct by the closure of an initiating switch may be cut off and maintained in a quiescent condition after one desired period of operation despite the fact that the initiating switch is maintained closed.

One object of the present invention is to provide an electrical circuit arrangement which will economically effect a non-repeat action of an electronic tube.

Another object of the present invention is to provide an electrical circuit arrangement in which an initiating switch serves as a portion of an electrical path by which a capacitor is charged to maintain an electronic tube in a quiescent condition.

Another object is to provide non-repeat circuits in which an electronic tube having a plurality of principal and control electrodes is rendered conducting by closure of a manually operated contact, and which is maintained in a cut-off condition by a capacitive charge drawn through the contact and through one of the control electrodes and one of the principal electrodes of the electronic tube.

Another object is the provision of a non-repeat circuit in which a capacitor is charged through a closed contact of a manually operable switch, the charge being drawn through one of the control electrodes of an electronic tube and applying a bias to maintain the tube in cut-off condition, and in which the bias is rapidly dissipated upon opening of the manually operated switch.

Other objects and features of the invention will be readily apparent to those skilled in the art from the specification and appended drawing illustrating certain preferred embodiments in which:

The figure is a diagrammatic representation of a circuit for electronic welding in which the circuit arrangement of the present invention is incorporated.

In the figure, the numerals 1 and 2 represent a pair of supply lines which are connected to a source of energy which is not shown. Connected across the supply lines is a first transformer 3 having a secondary 4 which supplies voltage to the conductors 5, 6 and 7. A half wave rectifier 8 is connected between the conductors 5 and 6 and operates, together with a smoothing capacitor 9, to supply a pulsating direct voltage to this circuit. Paralleling the capacitor 9 is a pair of voltage dividing resistors 11 and 12 which introduce a voltage into a timing

2 circuit comprising a capacitor 13 and a parallel adjustable resistor 14, the timing circuit being in the circuit of a control grid 15 of an electronic tube 16, the tube 16 having an anode 17 and cathode 18. Cathode 18 is connected to conductor 6, and anode 19 is connected through a resistor 19 and a contact 85 to conductor 5.

In parallel with the resistor 19 is a timing circuit comprising an adjustable resistor 21 and a capacitor 22. A conductor 23, connected between the resistor 21 and the capacitor 22, is connected to the cathode 24 of an electronic tube 25 having an anode 26 and a control grid 27, the latter being connected between a pair of voltage dividing resistors 28 and 29 connected between the conductors 5 and 6. A transformer 31 is connected across the supply lines 1 and 2 and has a secondary 32 connected to cathode 24 and anode 26 through a circuit including a relay coil 33 which is paralleled by a capacitor 34, the parallel combination being further paralleled by the primary 35 of a transformer 36.

Adapted to be closed by energization of the relay coil 33 is a normally open contact 37 which is conventionally disposed in circuit with a pair of inverse parallel ignitrons 38 and 39, the ignitrons firing upon closure of the normally open contact 37, and connected between the supply lines 1 and 2 through a welding transformer 41 having a secondary 42 for passing current through the work to be welded.

The secondary of transformer 36 is connected to a control grid 43 of an electronic tube 44 through a grid resistor 45, the tube 44 having an anode 46 and a cathode 47. The anode 46 is connected to conductor 5 and the cathode 47 is connected between a pair of voltage dividing resistors 48 and 49 which are in series across the conductors 5 and 6, and to a timing circuit comprising a capacitor 51 and paralleled adjustable resistor 52. This timing circuit is connected to a control grid 53 of an electronic tube 54 having an anode 55 and a cathode 56, the anode 55 being connected to the conductor 7 through a resistor 57, the cathode 56 being connected to conductor 6. A resistor 58 connects a control grid 59 of an electronic tube 61 to the anode 55 of the tube 54. Tube 61 has an anode 62 connected to conductor 5 and a cathode 63 connected through a resistor 64 to conductor 6.

Also connected to cathode 63 is one terminal of a capacitor 65, the tube 61-capacitor 65 circuit being paralleled by a resistor 66 electrically connected to a control grid 67 of an electronic tube 68. The tube 68 has an anode 69, a cathode 71 and a shield grid 72, a capacitor 73 being disposed between the shield grid 72 and the cathode 71 and conductor 6. A second capacitor 74 is disposed between the control grid 67 and the cathode 71. A resistor 75 is disposed between the shield grid 72 and the control grid 67. Another capacitor 82 is connected between the anode 69 of the tube 68 and the shield grid 72 thereof. Connected across the supply lines 1 and 2 is a transformer 76, a secondary 77 of this transformer being disposed so as to supply current through the tube 68. Serially connected in the circuit of the secondary 77 and the anode 69 and cathode 71 of tube 68 is a manually operable switch 78 and a relay coil 79, a capacitor 81 being paralleled with the relay coil 79. Disposed so as to be operated by energization of the relay coil 79 is a group of contacts numbered 83, 84, 85, 86 and 87. The contact 83, which is normally open, controls energization of a pressure valve solenoid 88 which is connected across the supply lines 1 and 2 through this contact.

It should be noted that in the description of the circuit, certain conventional elements have been eliminated, such as surge bypass capacitors, cathode heaters, fuses, etc., although these and other conventional elements would be present in an operating circuit. This elimination of conventional parts has been effected for purposes of simplicity, their position and function being well known to those familiar with the art.

The operation of the circuit will now be described. Prior to closure of the initiating contact, the contact 83 is open and the valve solenoid 88 is deenergized. The capacitor 13 is charged through the normally closed contact 84 by grid rectification of tube 16 to approximately the amount of D. C. voltage between the conductors 5 and 6. The anode of tube 16 is disconnected from the conductor 5 due to the open condition of contact 85, while the closed contact 86 shorts out the capacitor 22. In addition, the contacts 87 are opened so that no closed electrical circuit across the transformer secondary 77 exists. A direct current charges capacitor 74 through resistor 66 and thereby a bias is applied to the control grid 67 of tube 68 to maintain the tube in condition so that it is ready to conduct.

When initiating contact 78 is closed, tube 68 begins to conduct as soon as the anode 69 thereof is driven positive by the secondary 77 of transformer 76. The conduction current of tube 68 energizes the relay coil 79, capacitor 81 acting to maintain current flow through the relay coil during half cycles of non-conduction, the relay operating contacts 83 through 87. The relay is designed so that the normally closed contacts are opened before the normally opened contacts are closed. Thus, contacts 84 and 86 are opened before contacts 83, 85 and 87 are closed. As contact 84 opens, the control grid 15 of tube 16 is swung rapidly negative by the charge upon capacitor 13, this charge, as previously mentioned, having been earlier established by grid conduction of tube 16. Opening of contact 86 removes the short circuit from capacitor 22. Closure of contact 83 then energizes the valve solenoid 88, which operates in the conventional manner to cause the welding electrodes to apply pressure to the work. Closure of contact 85 does not immediately cause tube 16 to conduct, due to the charge upon capacitor 13. Closure of contact 87 establishes a non-beat holding circuit across the initiating switch 78.

Tube 16 is maintained in a quiescent condition until the charge on capacitor 13 has been dissipated through adjustable resistor 14 to such a degree that the grid 15 of tube 16 is sufficiently positive to cause the tube 16 to conduct. As soon as this condition is satisfied, tube 16 conducts to effect current flow through adjustable resistor 21 and capacitor 22.

Before this conduction occurred, the grid 27 of tube 25 was negative with respect to cathode 24 thereof, the cathode being at a potential substantially that of the conductor 5. Tube 25, then, could not conduct. Immediately upon conduction of tube 16, however, the cathode 24 falls to a lower value of potential due to the voltage drop across resistor 21, the grid 27 of tube 25, therefore, in effect, being driven positively with respect to the cathode 24.

Tube 25 will thereupon conduct to energize relay coil 33 and the primary 35 of transformer 36. During the half cycle periods in which the secondary 32 of transformer 31 drives the anode 26 of tube 25 negative, thereby cutting off the tube, the capacitor 34 discharges through the relay coil 33 to maintain the relay in an energized condition. During the period of conduction of tube 25, therefore, the contact 37 is closed, the ignitrons 38 and 39 acting to pass current through the welding transformer 41 in conventional manner. Tube 25 will continue to conduct until a charge is built up upon capacitor 22, through adjustable resistor 21, by the conduction of tube 16, which is substantial enough to cause the grid 27 of the tube 25 to become negative with respect to the cathode thereof. When this condition is reached, the relay coil 33 is deenergized, contacts 37 are once again opened, and weld current ceases to flow through the ignitrons 38 and 39, and the welding transformer.

As soon as tube 25 conducts, grid 43 of tube 44 is driven positive by pulses of current through transformer 36, tube 44 thereupon conducting and acting to charge capacitor 51 by grid conduction of tube 54. Transformer 31 is polarized so that these pulses occur when the anode 55 of tube 54 is negative so that the charge on capacitor 51 acts to cut off the conduction of tube 54, which, therefore, does not conduct during the time in which tube 25 conducts. After tube 25 has ceased to conduct, tube 54 remains quiescent until the charge on capacitor 51 is dissipated in the adjustable resistor 52.

During the period in which tube 54 conducts, tube 61 is cut off; after tube 54 no longer conducts, however, the tube 61 grid 59 is at the potential of conductor 7 and is intermittently sufficiently positive so that tube 61 conducts to charge capacitor 65 through grid conduction of tube 68. When tube 54 resumes conduction, tube 61 grid 59 once more becomes negative, cutting off tube 61. The charge upon capacitor 65 then drives grid 67 of tube 68 negative, cutting off tube 68 conduction. Relay coil 79 is thereby deenergized, and the contacts controlled thereby return to their normal position as illustrated in the figure.

If the initiating contact 78 was closed only momentarily at the initiation of the welding cycle, the charge on capacitor 65 rapidly bleeds off thereby permitting tube 68 to conduct for the next welding cycle as soon as the initiation switch is again closed. With the circuit arrangement of the applicant's invention, however, the welding cycle cannot repeat should the initiating contact be inadvertently held closed, thereby providing a desirable safety feature. Should initiating contact 78 be held closed when tube 68 is cut off, current will flow from the secondary 77 of transformer 76 through the closed initiating contact 78 to charge capacitor 82 to a voltage value determined by the voltage dividing action of capacitors 82 and 73. This charge on capacitor 82 is effected by shield grid 72 conduction of tube 68, this occurring while conduction of tube 68 is cut off due to the negative control grid potential. This shield grid conduction ceases as the positive crest value of supply voltage is passed. The control grid 67 of tube 68 is connected to capacitor 82 through resistor 75, the control grid 67 therefore being maintained negative due to the charge on capacitor 82 as shield grid conduction of tube 68 is terminated. This charge on capacitor 82 tends to dissipate through capacitors 73, 74 and resistor 75, thereby maintaining a negative voltage upon the grid 67 of tube 68. During each positive half cycle in which the contact 78 is held closed, this charge on capacitor 82 is reestablished through momentary shield grid conduction of tube 68. Tube 68 will, therefore, not conduct to initiate another sequential operation despite the fact that the initiating switch is held closed. Before another period of tube 68 conduction can occur, the initiating contact 78 must be opened, in which case the negative voltage at the control grid is quickly dissipated, thereby setting the circuit for the next welding cycle.

It will, therefore, be seen that this non-repeat circuit arrangement provides an inexpensive and extremely reliable method of insuring that only one operation shall occur with every single closure of the initiating switch, it always being necessary to open the initiating contact before another sequence can be initiated.

It is further obvious that this particular circuit arrangement may be disposed in any circuit in which non-repeat action is desirable, no particular relationship to a welder sequencing circuit being inherent in this circuit arrangement.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In a non-repeat circuit arrangement, a source of voltage, a normally open switch, a capacitor, an electronic tube, means connecting said electronic tube across said source of voltage through said switch, means connecting said capacitor across said source of voltage through said switch, said last mentioned means including a path through said electronic tube, said capacitor charging through said switch and path when the tube becomes non-conducting at the termination of a control cycle and applying a bias to maintain cut-off of said tube until said switch is opened, and means responsive to current flow through said electronic tube for initiating a control cycle.

2. In a non-repeat circuit arrangement, a source of voltage, a normally open switch, a capacitor, an electronic tube, means connecting said electronic tube across said source of voltage through said switch, means connecting said capacitor across said source of voltage through said switch, said last mentioned means including a path through said electronic tube, said capacitor charging through said switch and path when the tube becomes non-conducting at the termination of a control cycle and applying a bias to maintain cut-off of said tube until said switch is opened, impedance means through which the capacitor discharges to apply said cut-off bias, and means responsive to current flow through said electronic tube for initiating a control cycle.

3. In a non-repeat circuit arrangement, a source of voltage, a normally open switch, a capacitor, an electronic tube of the type having a pair of principal electrodes and at least a pair of auxiliary electrodes, means connecting said principal electrodes across said source of voltage through said switch, means connecting said capacitor across said source of voltage through said switch, said last mentioned means including at least that portion of said electronic tube between one of said principal electrodes and one of said auxiliary electrodes so that said capacitor is charged when the electronic tube is cut off with the switch closed, impedance means paralleling said path through said electronic tube through which the capacitor discharges to apply a cut-off bias to another auxiliary element to maintain the electronic tube cut-off while the switch remains closed, and means responsive to current flow through the principal electrodes of said electronic tube for initiating a control cycle.

4. In a non-repeat circuit arrangement, a source of voltage, a normally open switch, a capacitor, an electronic tube, means connecting said electronic tube across said source of voltage through said switch, said tube being of the type having a pair of principal electrodes and a pair of auxiliary electrodes, means connecting said capacitor across said source of voltage through said normally open switch, said last mentioned means including a path through said electronic tube between one of said principal electrodes and one of said auxiliary electrodes so that said capacitor is charged when the electronic tube is cut off with the switch closed, said capacitor being also connected to the other of said principal electrodes, and means paralleling said path through said electronic tube including impedance means connecting said one of said electrodes and the other of said auxiliary electrodes and through which the capacitor discharges to apply a cut-off bias to the other auxiliary electrode to maintain the electronic tube cut-off bias to the other auxiliary electrode to maintain the electronic tube cut-off while the switch remains closed, and means responsive to current flow through the principal electrodes of said electronic tube for initiating a control cycle.

5. In a non-repeat circuit arrangement, a source of voltage, a normally open switch, a capacitor, an electronic tube, means connecting said electronic tube across said source of voltage through said switch, said tube being of the type having at least a pair of principal electrodes and a pair of auxiliary electrodes, means connecting said capacitor across said source of voltage through said normally open switch, said last mentioned means including a path through said electronic tube between one of said principal electrodes and one of said auxiliary electrodes so that said capacitor is charged when the electronic tube is cut off with the switch closed, said capacitor being also connected to the other of said principal electrodes, a second capacitor connected to said one of said pair of principal electrodes and to the other of said auxiliary electrodes, a resistor connected between said auxiliary electrodes so that said first mentioned capacitor discharges through said second capacitor and said resistor to apply a cut-off bias to said other auxiliary electrode to maintain the electronic tube cut-off while the switch remains closed, and means responsive to current flow through the principal electrodes of said electronic tube for initiating a control cycle.

6. In a non-repeat circuit arrangement, a source of voltage, a normally open switch, a capacitor, an electronic tube, means connecting said electronic tube across said source of voltage through said switch, said tube being of the type having at least a pair of principal electrodes and control and shield grids, means connecting said capacitor across said source of voltage through said normally open switch, said last mentioned means including at least that portion of said electronic tube between the first of said principal electrodes and said shield grid so that said capacitor is charged by current flow between the shield grid and the first of said principal electrodes when current flow between the principal electrodes of said electronic tube has been cut off while the switch remains closed, said capacitor also being connected to the other of said principal electrodes, capacitive means coupling said control grid and the first of said principal electrodes, resistive means coupling said shield and control grids, and means responsive to current flow through the principal electrodes of said electronic tube for initiating a control cycle.

7. In a non-repeat circuit arrangement, a source of voltage, a normally open switch, a first capacitor, an electronic tube, means connecting said electronic tube across said source of voltage through said switch, said tube being of the type having an anode and cathode and control and shield grids, means connecting said first capacitor to said normally open switch and the anode of said electronic tube, a second capacitor connected between said first capacitor and the cathode of said electronic tube, said first and second capacitors being connected to the shield grid thereof so that said first capacitor is charged by current flow between the shield grid and the cathode of said electronic tube when current flow between the anode and cathode has been cut off with the switch closed, a third capacitor connecting the control grid and the cathode of said electronic tube, a resistor connecting the control and shield grids of said electronic tube so that said first capacitor discharges through said third capacitor and resistor to apply a cut-off bias to the control grid to maintain the electronic tube cut off while the switch remains closed, and means responsive to current flow between the anode and cathode of said electronic tube for initiating a control cycle.

8. In a non-repeat circuit arrangement, a source of voltage, a normally open switch, a capacitor, an electronic tube, means connecting said electronic tube across said source through said switch, said tube being of the type having a pair of principal electrodes and at least a pair of auxiliary electrodes, means connecting said capacitor across said source of voltage through said normally open switch, said last mentioned means including a path through said electronic tube between one of said principal electrodes and one of said auxiliary electrodes so that said capacitor is charged when the electronic tube is cut off while the switch remains closed, said capacitor being also connected to the other of said pair of principal electrodes, means paralleling said path through said electronic tube including impedance means connecting said one of said pair of principal electrodes and the other of said pair of auxiliary electrodes, means responsive to current flow through the principal electrodes of said electronic tube for initiating a control cycle, and means connected between the control grid and cathode of said electronic tube for applying a cut-off voltage therebetween to effect the termination of a period of conduction of said electronic tube.

9. In a non-repeat circuit arrangement, a source of voltage, a normally open switch, a capacitor, an electronic tube, means connecting said electronic tube across said source of voltage through said switch, means connecting said capacitor across said source of voltage through said switch, said last mentioned means including unidirectionally conducting means, said capacitor charging through said switch and unidirectionally conducting means when the tube becomes non-conducting at the termination of a control cycle and applying a bias to maintain cut-off of said tube until said switch is open, and means responsive to current flow through said electronic tube for initiating a control cycle.

ERNEST G. ANGER.
ROBERT C. MIERENDORF.

REFERENCES CITED

The following references are of record in the file of this patent:

UNITED STATES PATENTS

| Number | Name | Date |
|---|---|---|
| 2,463,318 | Schneider | Mar. 1, 1949 |
| 2,471,834 | McDowell | May 31, 1949 |